(12) United States Patent
Bruno et al.

(10) Patent No.: US 10,371,226 B2
(45) Date of Patent: Aug. 6, 2019

(54) HYDRAULIC SHOCK-ABSORBER FOR A VEHICLE SUSPENSION

(71) Applicant: SISTEMI SOSPENSIONI S.p.A., Corbetta (IT)

(72) Inventors: Walter Bruno, Asti (IT); Piero Antonio Conti, Asti (IT); Giordano Greco, Turin (IT)

(73) Assignee: SISTEMI SOSPENSIONI S.p.A., Corbetta (IT)

( * ) Notice: Subject to any disclaimer, the term of this patent is extended or adjusted under 35 U.S.C. 154(b) by 0 days.

(21) Appl. No.: 15/557,598

(22) PCT Filed: Mar. 16, 2016

(86) PCT No.: PCT/EP2016/055642
§ 371 (c)(1),
(2) Date: Sep. 12, 2017

(87) PCT Pub. No.: WO2016/146660
PCT Pub. Date: Sep. 22, 2016

(65) Prior Publication Data
US 2018/0058533 A1    Mar. 1, 2018

(30) Foreign Application Priority Data

Mar. 16, 2015    (IT) .................. 102015000008777

(51) Int. Cl.
*F16F 9/346*    (2006.01)
*F16F 9/49*    (2006.01)
(Continued)

(52) U.S. Cl.
CPC ............ *F16F 9/3465* (2013.01); *B60G 13/08* (2013.01); *B60G 17/08* (2013.01); *F16F 9/185* (2013.01);
(Continued)

(58) Field of Classification Search
CPC .. F16F 9/3465; F16F 9/185; F16F 9/49; F16F 2228/066; F16F 2230/0023; B60G 13/08;
(Continued)

(56) References Cited

U.S. PATENT DOCUMENTS

2014/0360353 A1* 12/2014 Baalmann ................. F16F 9/49
   92/143
2015/0330475 A1* 11/2015 Slusarczyk ............ B21D 22/20
   188/288
(Continued)

FOREIGN PATENT DOCUMENTS

CN    103953676 A    7/2014
EP    1717478 B1    6/2009
(Continued)

OTHER PUBLICATIONS

International Search Report and Written Opinion for PCT International Application No. PCT/EP2016/055642 dated May 2, 2016 (11 pages).
(Continued)

*Primary Examiner* — Vishal R Sahni
(74) *Attorney, Agent, or Firm* — Howard & Howard Attorneys PLLC

(57) ABSTRACT

The hydraulic shock-absorber comprises a hydraulic stop member having a cup-shaped body, which is adapted to be mounted in a compression chamber, and a plunger, mounted at an end of a rod of the shock-absorber so as to slide in the cup-shaped body when the shock-absorber moves towards the compression end-of-travel position. The cup-shaped body comprises a side wall and a bottom wall which define, along with the plunger, a working chamber in which a damping fluid of the shock-absorber is compressed by the plunger when the latter slides in the working chamber towards the bottom wall of the body. Axial channels are formed on the inner surface of the side wall of the body and
(Continued)

allow the damping fluid to flow axially out of the working chamber when the plunger slides in the working chamber towards the bottom wall of the cup-shaped body. The axial channels extend parallel to a longitudinal axis (z) of the cup-shaped body and have a cross-section whose area decreases continuously along this axis (z) towards the bottom wall of the cup-shaped body.

14 Claims, 6 Drawing Sheets

(51) Int. Cl.
  *B60G 13/08* (2006.01)
  *B60G 17/08* (2006.01)
  *F16F 9/18* (2006.01)
(52) U.S. Cl.
  CPC ............ *F16F 9/49* (2013.01); *B60G 2206/41* (2013.01); *B60G 2500/11* (2013.01); *B60G 2800/162* (2013.01); *F16F 2228/066* (2013.01); *F16F 2230/0023* (2013.01)
(58) Field of Classification Search
  CPC .............. B60G 17/08; B60G 2800/162; B60G 2206/41; B60G 2500/11
  See application file for complete search history.

(56) References Cited

U.S. PATENT DOCUMENTS

2016/0091046 A1* 3/2016 Soromenho ............... F16F 9/49
  188/297
2016/0223045 A1* 8/2016 Baldoni .................... F16F 9/48

FOREIGN PATENT DOCUMENTS

| EP | 2302252 A1 | 3/2011 |
| WO | 2005106282 A1 | 11/2005 |
| WO | 2014165951 A1 | 10/2014 |

OTHER PUBLICATIONS

International Preliminary Report on Patentability for PCT International Application No. PCT/EP2016/055642 dated May 30, 2017 (19 pages).

Transmittal of correct Annex to International Preliminary Report on Patentability for PCT International Application No. PCT/EP2016/055642 dated Jun. 14, 2017 (15 pages).

\* cited by examiner

HYDRAULIC SHOCK-ABSORBER FOR A VEHICLE SUSPENSION

CROSS-REFERENCE TO RELATED APPLICATIONS

The present application is a National Stage of International Patent Application No. PCT/EP2016/055642, filed on Mar. 16, 2016, which claims priority to and all the benefits of Italian Patent Application No. 102015000008777, filed on Mar. 16, 2015, both of which are hereby expressly incorporated herein by reference in their entirety.

BACKGROUND OF THE INVENTION

1. Field of the Invention

The present invention relates in general to a hydraulic shock-absorber for a vehicle suspension, in particular a twin-tube hydraulic shock-absorber. More specifically, the present invention relates to a hydraulic shock-absorber comprising a hydraulic stop member arranged to operate during the compression stroke of the shock-absorber.

2. Description of the Related Art

A hydraulic shock-absorber as specified above is known from CN 103 953 676 A.

As it is known, a twin-tube hydraulic shock-absorber for a vehicle suspension typically comprises an outer cylindrical tube, an inner cylindrical tube coaxial with the outer cylindrical tube and defining with the latter an annular chamber which is filled with gas in an upper portion thereof, a rod arranged coaxially with the two cylindrical tubes and partially projecting from the latter, and a piston which is slidably mounted in the inner cylindrical tube and is attached to the bottom end of the rod. The piston separates the inner volume of the inner cylindrical tube into a rebound chamber and a compression chamber, in which a damping fluid (oil) is contained. The piston is provided with a first pair of check valves, namely a compensation valve which controls the flow of the damping fluid from the compression chamber to the rebound chamber during the compression stroke of the shock-absorber and a rebound valve which controls the flow of the damping fluid from the rebound chamber to the compression chamber during the rebound stroke of the shock-absorber. A valve assembly is arranged on the bottom of the shock-absorber and comprises a second pair of check valves, namely a compression valve which controls the flow of the damping fluid from the compression chamber to the annular chamber during the compression stroke and an intake valve which controls the flow of the damping fluid from the annular chamber to the compression chamber during the rebound stroke.

Traditionally, a hydraulic shock-absorber for a vehicle suspension is provided with a first end stop member, which is arranged inside the shock-absorber and is configured to operate during the rebound stroke of the shock-absorber, and a second end stop member, which is arranged outside the shock-absorber and is configured to operate during the compression stroke of the shock-absorber.

The end stop members may be of elastic or hydraulic type.

The elastic end stop members are made of high-stiffness elastic material (for example polyurethane) and have the function of ensuring that when shock-absorber reaches the end-of-travel position, either during the rebound stroke or during the compression stroke, there are elastic shocks between the surfaces that come into contact, instead of shocks between metal surfaces. The elastic end stop members behave therefore as springs which at the end-of-travel positions act in parallel with the mechanical springs (main spring) of the suspension and have a much higher stiffness than that of the mechanical spring of the suspension. However, the elastic end stop members do not operate in any intermediate point of the stroke of the shock-absorber.

The elastic end stop members have, among others, the following disadvantage. In case of a heavy shock on the stop members, either during the rebound stroke or during the compression stroke, caused for example by obstacles (holes or bumps) on the road, the kinetic energy of the suspension is converted into elastic deformation energy of the stop member in question. The elastic energy stored by the stop member is completely (or almost completely) released in the subsequent phase of change of direction of the motion. Accordingly, after the shock the suspension continues to oscillate without its motion being sufficiently dampened, and these oscillations adversely affect the adherence of the tyre with the road, and hence result in a worse road-holding of the vehicle.

In order to overcome the aforesaid disadvantage of the elastic stop members, it is known to use hydraulic stop members, either alone or in combination with elastic stop members. The hydraulic stop members are energy dissipating devices which allow, when an end-of-travel position is reached, to hydraulically dissipate the kinetic energy of the suspension by forcing a certain amount of oil contained in the shock-absorber to laminarly flow through suitably calibrated passages. In this way, the energy produced as a result of a shock is hydraulically dissipated and is not returned to the suspension in the subsequent phase of change of direction of the motion. The oscillations of the suspension are thus dampened, which increases the adherence of the tyre with the road and therefore improves the road-holding of the vehicle. If, on the other hand, the same performances in terms of road-holding are kept, it is possible, by virtue of the hydraulic stop members, to reduce the size of the tyres and hence their rolling resistance, thereby decreasing fuel consumption and emissions.

Furthermore, since the hydraulic stop members act in parallel with the respective elastic stop members, part of the energy generated by the shock is hydraulically absorbed and it is therefore possible to reduce the size of the elastic stop members and of the relating supports.

Finally, while the action of the elastic stop members depends on the deformation to which these members are subject, the action of the hydraulic stop members is proportional to the speed with which the rod of the shock-absorber reaches the end-of-travel position. The hydraulic stop members allow therefore to manage in a much more progressive manner the impacts occurring when the end-of-travel positions of the shock-absorber are reached.

The hydraulic stop members are almost exclusively used as rebound stop members. Documents EP 2 302 252, WO 2014/165951, US 2014/0360353 and WO 2005/106282 disclose examples of hydraulic stop members which act during the rebound stroke of the hydraulic shock-absorber and are therefore intended to be mounted in the rebound chamber of the shock-absorber.

There are however some examples of hydraulic stop members acting during the compression stroke.

EP 1 717 478 discloses a hydraulic stop member for a motor-vehicle comprising a cup-shaped body, which is adapted to be fixedly mounted inside the compression chamber of the shock-absorber, and a plunger, which is adapted to be attached to the bottom end of the rod of the shock-absorber (i.e. the end facing the bottom of the shock-absorber). The plunger is able to slide along a cylindrical side wall of the cup-shaped body. This wall has a number of holes to allow the oil to flow out of the cup-shaped body when the plunger is urged towards the latter, during the compression stroke of the shock-absorber, and hence compress the oil contained in a working chamber of the cup-shaped body. The plunger comprises a shaft and a head, the head being slidably mounted between a shoulder formed by the shaft and a nut mounted at the free end of the shaft. Conduits are provided along the perimeter of a central hole of the head (hole through which the shaft extends) to allow the oil to flow therethrough when the head is in abutment against the nut during the rebound stroke of the shock-absorber.

In such a stop member the motion of the plunger, and hence the motion of the rod of the shock-absorber, is dampened during the compression stroke of the shock-absorber as a result of the oil flowing out of the cup-shaped body through the holes provided in the cylindrical side wall of that body. As the plunger moves towards the inside of the cup-shaped body, an increasing number of holes is closed by the plunger, whereby the damping effect produced by the device is increased. The change in damping that can be obtained with such a stop member is thus a discrete change, not a continuous one.

SUMMARY OF THE INVENTION

It is an object of the present invention to provide a hydraulic shock-absorber for a vehicle suspension having a hydraulic stop member acting during the compression stroke of the shock-absorber, which allows to change continuously and progressively the damping effect produced by the stop member on the rod of the shock-absorber during the compression stroke of the shock-absorber.

Another object of the present invention is to provide a hydraulic shock-absorber for a vehicle suspension having a hydraulic stop member acting during the compression stroke of the shock-absorber, which can be manufactured easily and inexpensively.

It is still a further object of the present invention to provide a hydraulic shock-absorber for a vehicle suspension having a hydraulic stop member acting during the compression stroke of the shock-absorber, which allows to limit the maximum pressure of the oil in the working chamber of the cup-shaped body and therefore to avoid the risk that the stop member is damaged due to an excessive pressure in the working chamber.

These and other objects are fully achieved according to the invention by virtue of a hydraulic shock-absorber for a vehicle suspension having a hydraulic stop member acting during the compression stroke of the shock-absorber, wherein a plurality of axial channels (or grooves) are formed on the inner surface of the side wall of the cup-shaped body for allowing the oil to flow axially out of the working chamber of the cup-shaped body when the piston moves towards the bottom wall of the cup-shaped body, said axial channels having a cross-section whose area decreases continuously along the axial direction towards the bottom wall of the cup-shaped body, and wherein the side wall of the cup-shaped body has a plurality of passages (which may be made as radial openings or axial passages) for putting the portion of the compression chamber comprised between the piston of the shock-absorber and the plunger of the hydraulic stop member into communication with the valve assembly (compression valve and intake valve) arranged on the bottom of the shock-absorber. By virtue of the special configuration of the axial channels made on the inner surface of the side wall of the cup-shaped body, the area of the flow section through which the oil contained in the working chamber may flow out of the cup-shaped body decreases continuously towards the bottom wall of the cup-shaped body, and therefore the damping effect produced by the stop member on the rod of the shock-absorber increases continuously and progressively as the latter moves towards the compression end-of-travel position. Naturally, by suitably defining the number and/or the cross-section of the axial channels it is possible to obtain a given law of change in the damping produced by the stop member as a function of the travel of the piston along the axis of the cup-shaped body.

According to an embodiment, the side wall and the bottom wall of the cup-shaped body are made as separate pieces and are securely connected to each other, for example by force-fitting. This makes the manufacturing process of the stop member easier and less expensive.

The side wall of the cup-shaped body comprises a first wall portion of cylindrical shape, or inlet wall portion, which faces towards the opposite side of the bottom wall of the cup-shaped body, a second wall portion of cylindrical shape, or lower wall portion, which faces towards the bottom wall of the cup-shaped body, and a third, tapered wall portion, or intermediate wall portion, which connects the inlet wall portion with the lower wall portion, wherein the inlet wall portion has an outer diameter substantially equal to the inner diameter of the inner cylindrical tube of the shock-absorber and is arranged to be securely connected to that tube inside the compression chamber of the shock-absorber, wherein the lower wall portion has an outer diameter smaller than the inner diameter of the inner cylindrical tube, and hence smaller than the outer diameter of the inlet wall portion as well, so as to form an annular passage with that tube. According to this embodiment, the axial channels are formed on the inner surface of the lower wall portion. Such an embodiment allows to easily mount the cup-shaped body, at the inlet portion thereof, onto the inner cylindrical tube of the shock-absorber and at the same time, by virtue of the openings provided in the intermediate wall portion, it does not jeopardize the operation of the shock-absorber, as the openings ensure that the oil volume comprised between the piston of the shock-absorber and the plunger of the stop member always communicates with the oil volume comprised in the annular passage, which is turn in communication with the valve assembly on the bottom of the shock-absorber.

According to a further aspect of the invention, the plunger of the hydraulic stop member comprises a cylindrical body which is adapted to be attached to the rod of the shock-absorber and has an outer diameter smaller than the inner diameter of the lower wall portion of the cup-shaped body, a seal ring which is mounted so as to be axially slidable around the cylindrical body and is adapted to seal against the inner surface of the lower wall portion of the cup-shaped body, and a first and second annular abutment member, which are axially restrained onto the cylindrical body and axially limit, in either direction, the axial sliding movement of the seal ring along the cylindrical body, wherein the seal ring, the first abutment member and the second abutment member are configured such that when the seal ring slides along the inner surface of the lower wall portion of the cup-shaped body during the compression stroke of the shock-absorber the seal ring is in abutment against the first abutment member and there is no oil flow from one side of the seal ring to the other, whereas during the rebound stroke of the shock-absorber the seal ring is in abutment against the second abutment member and oil flow is thus allowed from one side of the seal ring to the other, namely towards the working chamber of the cup-shaped body.

Preferably, a plurality of passages are provided in the bottom wall of the cup-shaped body for allowing the oil to flow out of the working chamber of the cup-shaped body to limit the maximum pressure of the oil in that chamber. The pressure in the working chamber of the cup-shaped body is thus prevented from reaching excessive values which might jeopardize the structural integrity of the stop member. Instead of, or in addition to, the passages in the bottom wall of the cup-shaped body, a gauged ring gap of the seal ring may perform the function of limiting the maximum pressure in the working chamber of the cup-shaped body.

According to an embodiment, the assembly formed by the first and second abutment members is axially restrained onto the cylindrical body of the piston by a pair of snap rings which are received in respective circumferential grooves formed in that body. This allows to easily and quickly assemble the plunger, without requiring for example welding operations.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE INVENTION

In the following description and claims, the terms "axial" and "axially" identify the direction of the longitudinal axis of the shock-absorber, coinciding with the direction of the longitudinal axis of the hydraulic stop member. Moreover, terms such as "upper" and "lower" are to be intended as referring to the arrangement of the shock-absorber shown in FIG. 1, where the piston of the shock-absorber is mounted at the bottom end of the rod and therefore the rod and the piston move downwards during the compression stroke of the shock-absorber and upwards during the rebound stroke of the shock-absorber.

Figure 1:
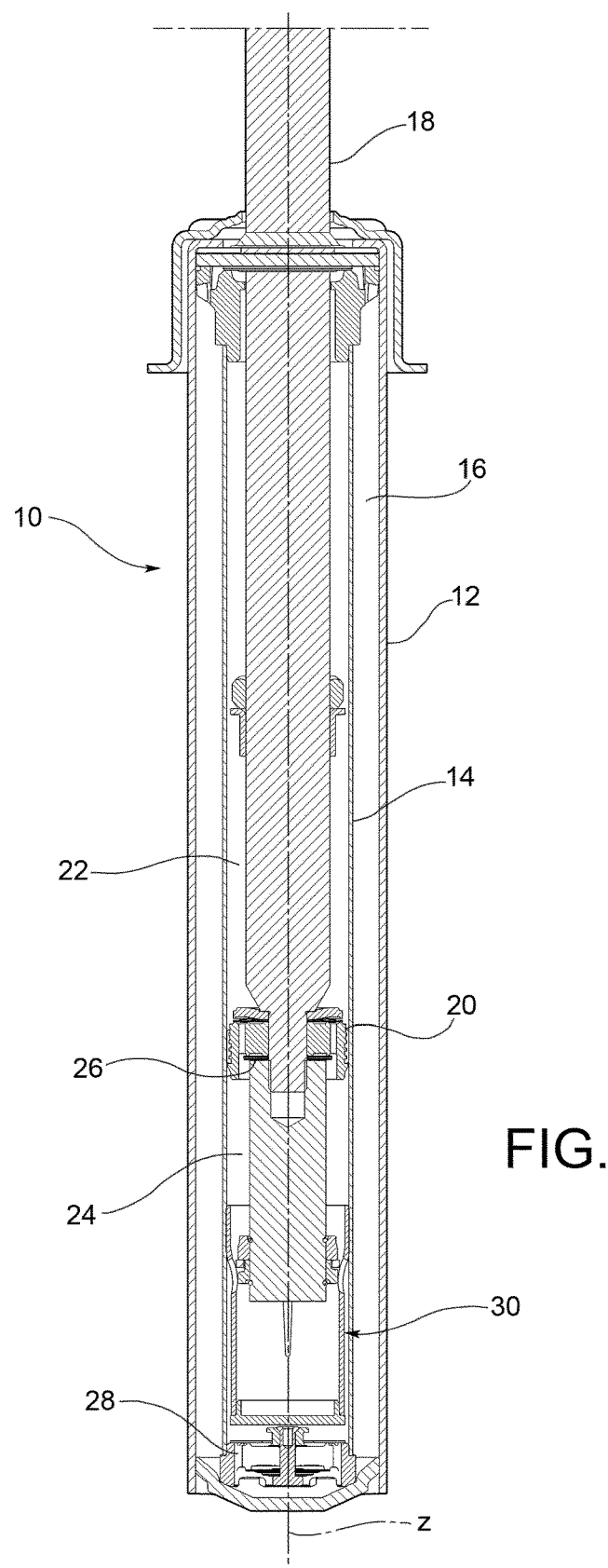
FIG. 1 is an axial section view of a twin-tube hydraulic shock-absorber for a vehicle suspension provided with a hydraulic compression stop member according to an embodiment of the present invention.

With reference first to FIG. 1, a twin-tube hydraulic shock-absorber for a vehicle suspension is generally indicated 10 and comprises, in per-se-known manner, an outer cylindrical tube 12, an inner cylindrical tube 14 which is arranged coaxially with the outer cylindrical tube 12 and defines with the latter an annular chamber 16 filled with gas in an upper portion thereof, a rod 18 which is arranged coaxially with the two cylindrical tubes 12 and 14 and partially projects from the latter, and a piston 20 which is slidably mounted in the inner cylindrical tube 14 and is attached to the bottom end of the rod 18. The piston 20 separates the inner volume of the inner cylindrical tube 14 into an upper chamber 22, or rebound chamber, and a lower chamber 24, or compression chamber, which chambers contain a damping fluid. Oil is typically used as damping fluid, and therefore the damping fluid will be referred to hereinafter, for the sake of simplicity, with the term "oil". It is however clear that the present invention is not limited to the use of oil as damping fluid.

The piston 20 is provided, in per-se-known manner, with a first valve assembly 26 comprising a pair of check valves, namely a compensation valve, which during the compression stroke of the shock-absorber controls the flow of the oil from the compression chamber 24 to the rebound chamber 22, and a rebound valve, which during the rebound stroke of the shock-absorber controls the flow of the oil from the rebound chamber 22 to the compression chamber 24. A second valve assembly 28 is arranged, in per-se-known manner, on the bottom of the shock-absorber 10, namely on the bottom of the inner cylindrical tube 14, and comprises a pair of check valves, namely a compression valve, which during the compression stroke controls the flow of the oil from the compression chamber 24 to the annular chamber 16, and an intake valve, which during the rebound stroke controls the flow of the oil from the annular chamber 16 to the compression chamber 24. The longitudinal axis of the shock-absorber 10 is indicated z.

Figure 2:
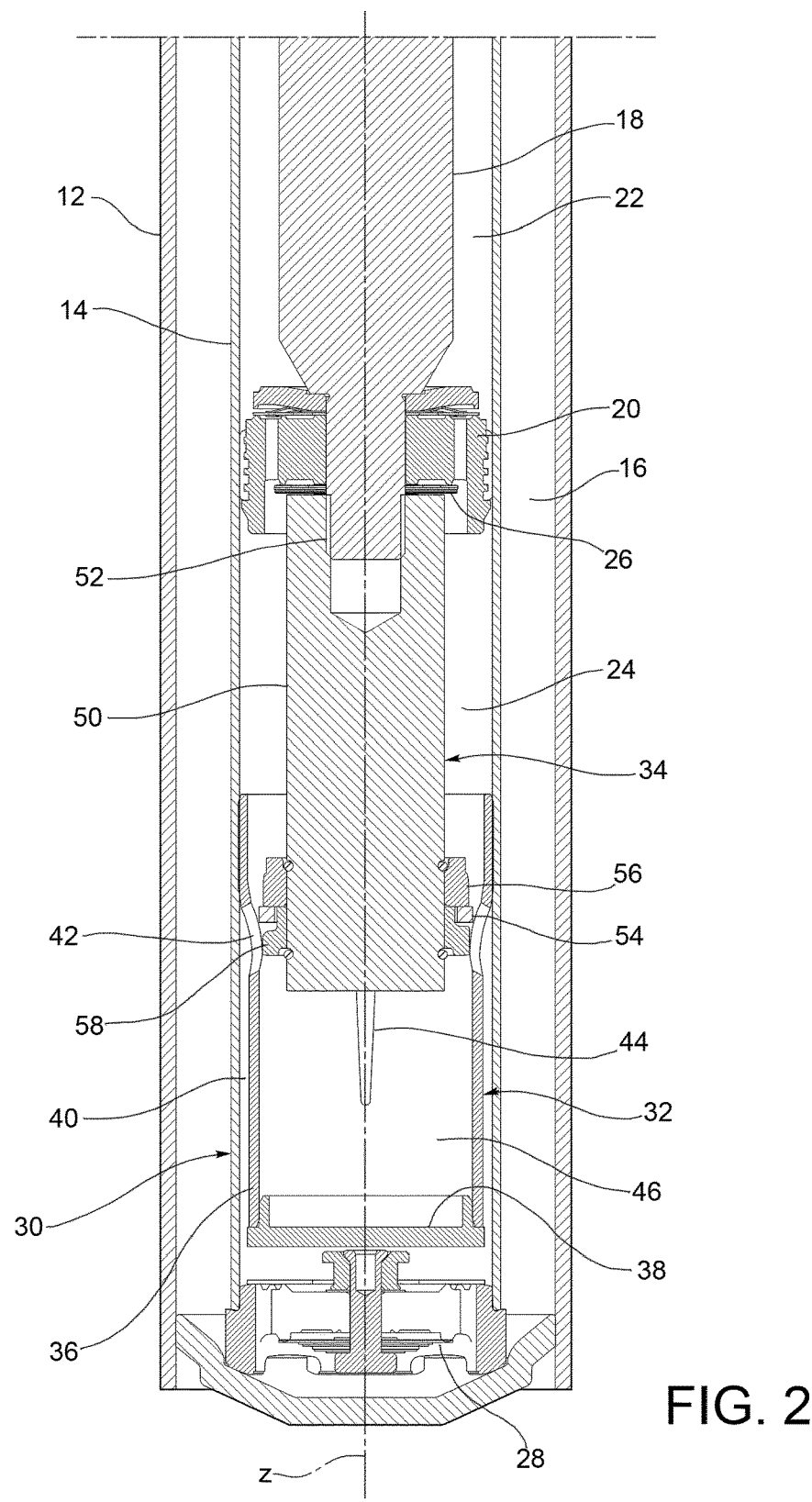
FIG. 2 is an axial section view, on an enlarged scale, of the bottom portion of the inner cylindrical tube of the shock-absorber of FIG. 1.

According to the invention, the shock-absorber 10 is provided with a hydraulic stop member, generally indicated 30, operating during the compression stoke of the shock-absorber to hydraulically dissipate the kinetic energy of the suspension when the shock-absorber is close to the compression end-of-travel position. As shown in FIGS. 1 and 2, the hydraulic stop member 30 is arranged in the compression chamber 24 of the shock-absorber, in particular on the bottom of the inner cylindrical tube 14.

Figure 3:
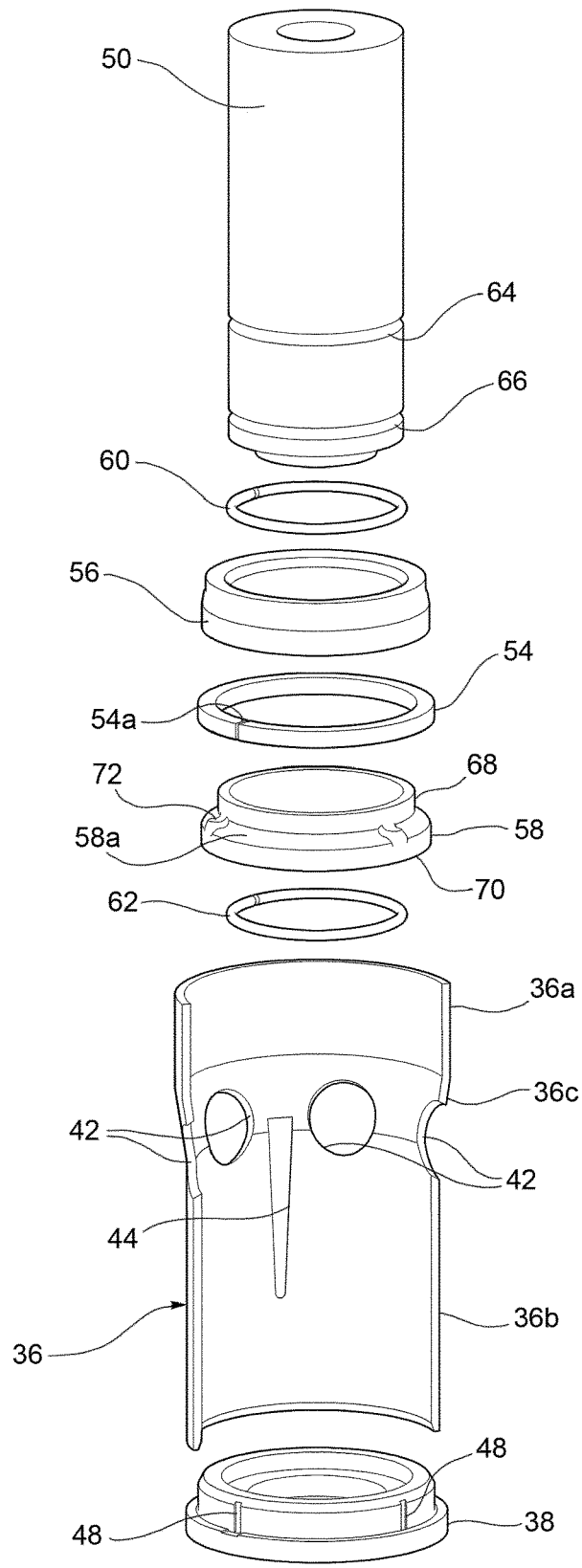
FIG. 3 is an exploded view of the hydraulic stop member of the shock-absorber of FIG. 1.

With reference also to FIG. 3, the hydraulic stop member 30 basically comprises a cup-shaped body 32, which is attached to the inner cylindrical tube 14 of the shock-absorber and extends coaxially therewith, and a plunger 34, which is connected to the rod 18 of the shock-absorber, preferably releasably (for example by means of a threaded connection), and is arranged to axially slide in the cup-shaped body 32 to compress the oil contained inside it.

The cup-shaped body 32 is open at its top end, i.e. at its end facing towards the piston 20 of the shock-absorber, and comprises a side wall 36 and a bottom wall 38. Preferably, the side wall 36 and the bottom wall 38 are made as separate pieces and are securely connected to each other, for example by force-fitting and/or suitable retaining means. According to the illustrated embodiment, the side wall 36 comprises a first wall portion 36a, or inlet wall portion, which faces towards the opposite side of the bottom wall 38, i.e. towards the same side as the opening of the cup-shaped body 32, a second wall portion 36b, or lower wall portion, which faces towards the bottom wall 38, and a third wall portion 36c, or intermediate wall portion, which connects the inlet wall portion 36a with the lower wall portion 36b. The inlet wall portion 36a has an outer diameter substantially equal to the inner diameter of the inner cylindrical tube 14. The inlet wall portion 36a is securely connected to the inner cylindrical tube 14, for example by force-fitting and/or by suitable retaining means. The lower wall portion 36b has an outer diameter smaller than the inner diameter of the inner cylindrical tube 14, and hence also smaller than the outer diameter of the inlet wall portion 36a. Between the lower wall portion 36b of the cup-shaped body 32 and the inner cylindrical tube 14 of the shock-absorber there is therefore an annular passage 40 (FIG. 2), which is in fluid communication with the portion of the compression chamber 24 underneath the bottom wall 38 of the hydraulic stop member. The intermediate wall portion 36c has a plurality of radial openings 42 configured to put the portion of the compression chamber 24 comprised between the piston 20 of the shock-absorber and the plunger 34 of the hydraulic stop member into communication with the annular passage 40, and hence with the second valve assembly 28 placed on the bottom of the inner cylindrical tube 14 of the shock-absorber, thereby allowing hydraulic supply of the second valve assembly 28 and hence correct operation of the shock-absorber.

A plurality of axial channels 44 are formed on the inner surface of the side wall 36 of the cup-shaped body 32, in particular on the inner surface of the lower wall portion 36b, and possibly also of the intermediate wall portion 36c, and allow axial flow of the oil out of the chamber (hereinafter referred to as working chamber 46) enclosed by the lower wall portion 36b and comprised between the plunger 34 and the bottom wall 38, when the plunger 34 moves towards the bottom wall 38. The axial channels 44 extend parallel to the axis z (longitudinal axis of the cup-shaped body 32), hence along the direction of the movement of the plunger 34. The axial channels 44 have a cross-section whose area decreases continuously towards the bottom wall 38. More specifically, the axial channels 44 have a width (i.e. a size in the circumferential direction) which decreases continuously, for example linearly, towards the bottom wall 38. Preferably, the depth (i.e. the size in the radial direction) of the axial channels 44 also decreases continuously, for example linearly, towards the bottom wall 38. The area of the flow section through which the oil is allowed to pass flowing out of the working chamber 46 decreases therefore continuously as the plunger 34 moves in the cup-shaped body 32 towards the bottom wall 38. The decrease in the area of the flow section results in a progressive increase in the damping force generated on the plunger 34 of the hydraulic stop member, and hence on the rod 18 of the shock-absorber to which the plunger 34 is attached. By suitably defining the number and/or the cross-section of the axial channels 44 it is thus possible to obtain a given law of variation of the damping force produced by the hydraulic stop member 30 as a function of the travel of the plunger 34 in the cup-shaped body 32.

As can be seen in FIG. 3, a plurality of passages 48 are advantageously formed in the bottom wall 38 of the cup-shaped body 32 and allow the oil to flow out of the cup-shaped body 32 to limit the maximum pressure of the oil in the working chamber 46. The pressure in the working chamber 46 of the cup-shaped body 32 is thus prevented from reaching excessive values which might jeopardize the structural integrity of the hydraulic stop member 30.

The plunger 34 of the hydraulic stop member 30 comprises a cylindrical body 50 which extends coaxially with the cup-shaped body 32 and is connected to the rod 18 of the shock-absorber, for example by a threaded connection 52, so as to move along the axis z as a single piece with the rod 18. The cylindrical body 50 has an outer diameter smaller than the inner diameter of the lower wall portion 36b of the cup-shaped body 32. The plunger 34 further comprises a seal ring 54, which is mounted so as to be axially slidable around the cylindrical body 50 and is adapted to seal against the inner surface of the lower wall portion 36b of the cup-shaped body 32. The seal ring 54 has, in per-se-known manner, a gap 54a.

Figure 4:
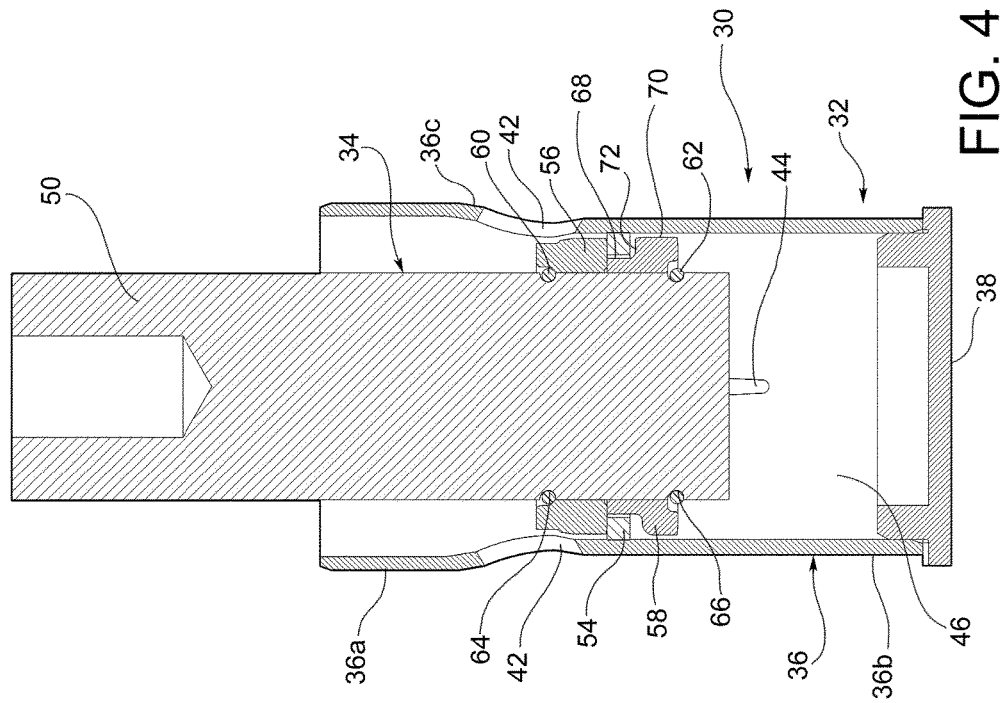
FIG. 4 is an axial section view of the hydraulic stop member of the shock-absorber of FIG. 1, during the compression stroke, with the seal ring of the plunger of the hydraulic stop member sliding along the inner surface of the lower wall portion of the cup-shaped body of the hydraulic stop member.
Figure 5:
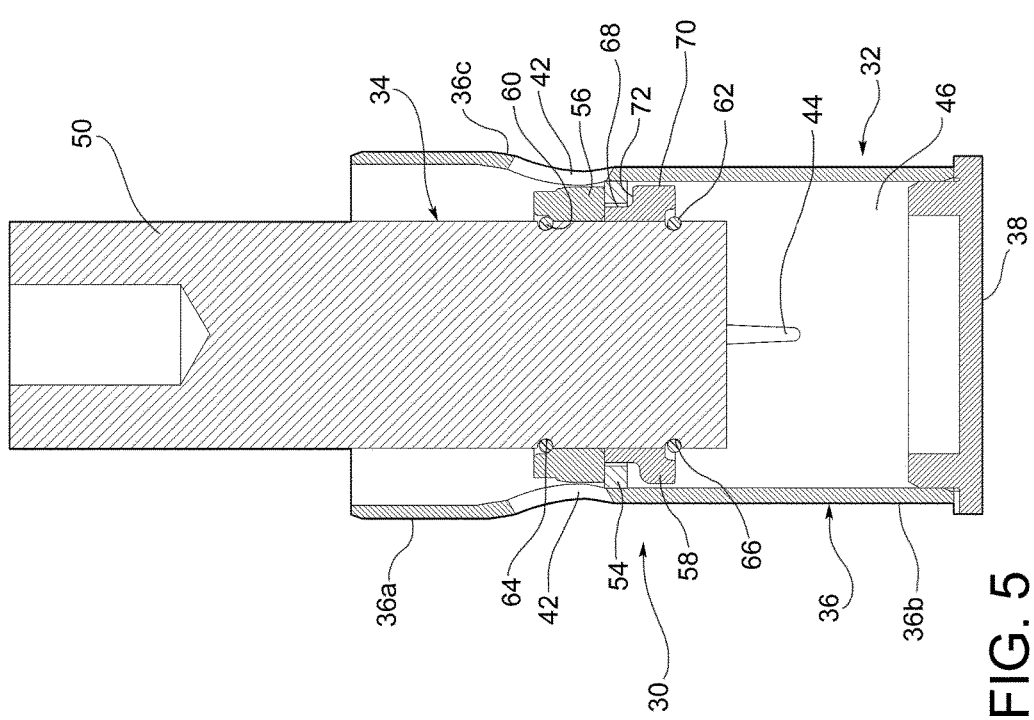
FIG. 5 is an axial section view of the hydraulic stop member of the shock-absorber of FIG. 1, during the rebound stroke of the shock-absorber, with the seal ring of the plunger of the hydraulic stop member sliding along the inner surface of the lower wall portion of the cup-shaped body of the hydraulic stop member.

The plunger 34 further comprises a pair of annular abutment elements 56 and 58, namely an upper abutment member 56 which is arranged above the seal ring 54, i.e. on the side of the seal ring facing towards the piston 20 of the shock-absorber, and a lower abutment member 58 which is arranged beneath the seal ring 54, i.e. on the side of the seal ring facing towards the working chamber 46 of the hydraulic stop member. The assembly formed by the two abutment elements 56 and 58 is axially restrained onto the cylindrical body 50 by a pair of snap rings 60 and 62 received in respective circumferential grooves 64 and 66 formed in the cylindrical body 50. The upper abutment member 56 forms an axial abutment surface 56a, axially facing downwards, i.e. towards the lower abutment member 58, against which the seal ring 54 comes into abutment during the compression stroke (FIG. 4). The lower abutment member 58 comprises an upper portion 68, around which the seal ring 54 is arranged, and a lower portion 70 having an outer diameter larger than that of the upper portion 68. The lower portion 70 of the lower abutment member 58 forms a shoulder 58a, axially facing upwards, i.e. towards the upper abutment member 56, on which a plurality of projections 72 are formed, against which the seal ring 54 comes into abutment during the rebound stroke (FIG. 5). The seal ring 54 can thus move axially between the axial abutment surface 56a of the upper abutment member 56 and the upper face of the projections 72 of the lower abutment member 58.

With reference in particular to FIGS. 4 and 5, the operation of the above-described hydraulic stop member 30 will be explained. During the compression stroke of the shock-absorber (FIG. 4), the seal ring 54 is in abutment against the axial abutment surface 56a of the upper abutment member 56. When the seal ring 54 of the plunger 34 begins to slide along the inner surface of the lower wall portion 36b of the cup-shaped body 32, the oil contained in the working chamber 46 of the hydraulic stop member is forced to flow axially out of that chamber passing through the axial channels 44. As explained above, the area of the flow section formed by the axial channels 44 decreases continuously as the plunger 34 moves towards the bottom wall 38 of the cup-shaped body 32. The damping effect produced by the hydraulic stop member 30 on the plunger 34, and hence on the rod 18 of the shock-absorber, increases therefore continuously. Once the seal ring 54 has passed beyond the bottom end of the axial channels 44, the oil can still flow out of the working chamber through the passages 48 formed in the bottom wall 38 of the cup-shaped body 32, which have an overall flow section area even smaller than that of the axial channels 44. This allows to avoid an excessive increase in the pressure inside the working chamber 46.

When the shock-absorber changes its direction of motion, i.e. during the rebound stroke (FIG. 5), the seal ring 54 moves away from the axial abutment surface 56a and comes into abutment against the upper face of the projections 72 of the lower abutment member 58. The oil is thus allowed to flow towards the working chamber 46 through the gap between the upper face of the seal ring 54 and the axial abutment surface 56a, through the annular passage between the seal ring 54 and the outer surface of the upper portion 68 of the lower abutment member 58 and through the gap between the lower face of the seal ring 54 and the shoulder 58a of the lower abutment member 58.

Figure 6:
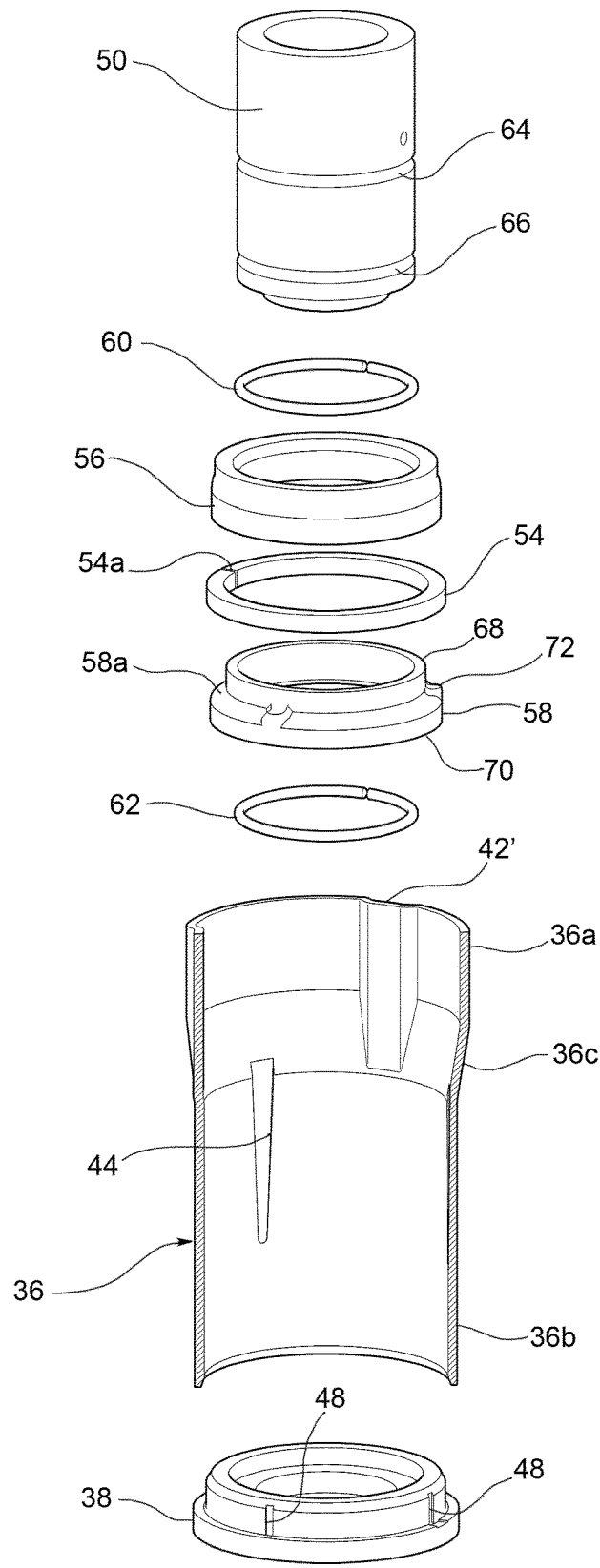
FIG. 6 is an exploded view of another embodiment of a hydraulic compression stop member for a twin-tube hydraulic shock-absorber for a vehicle suspension.
Figure 7:
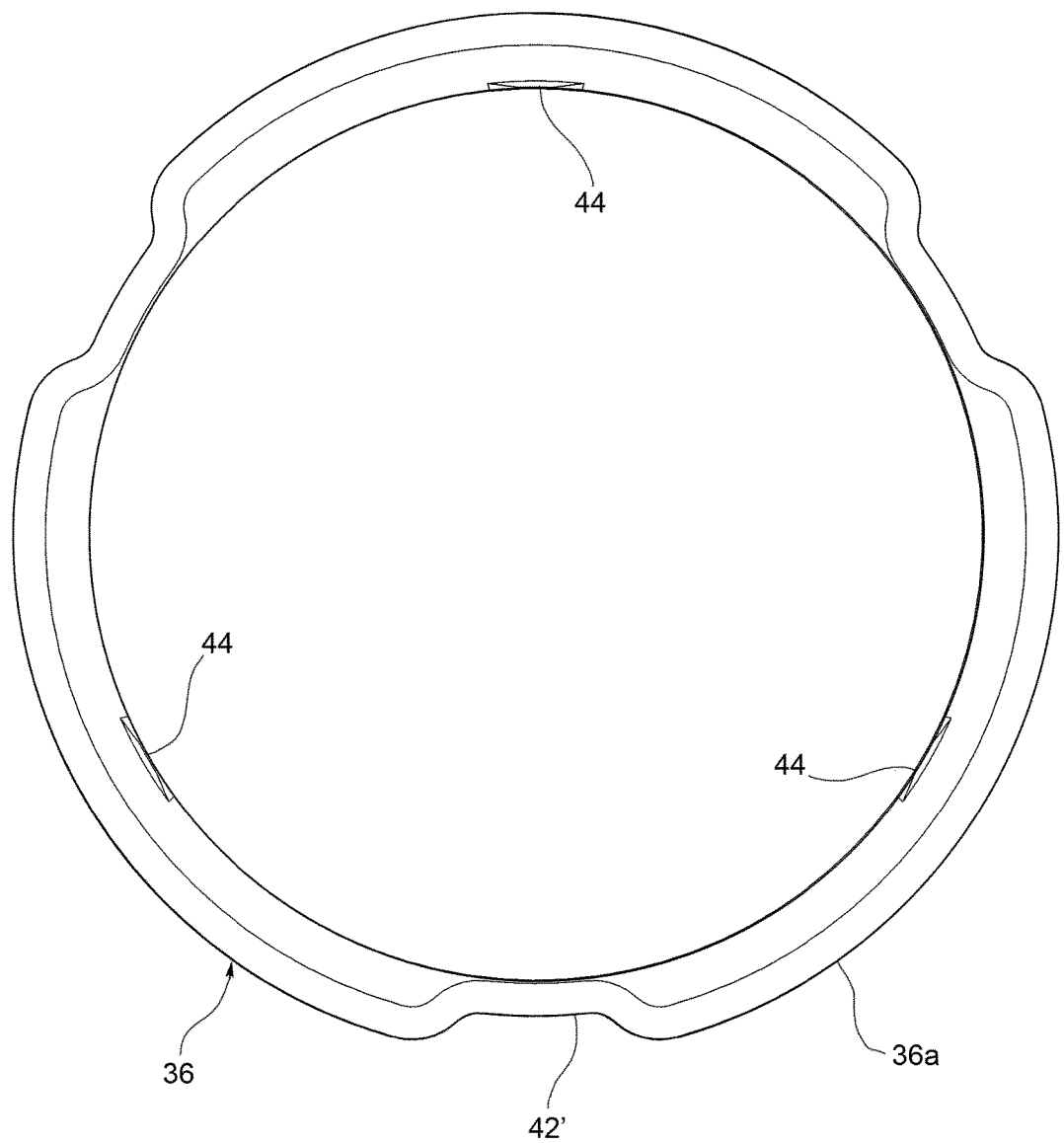
FIG. 7 is a plan view of the cup-shaped body of the hydraulic stop member of FIG. 6.

A variant of embodiment of the invention is illustrated in FIGS. 6 and 7, where parts and elements identical or corresponding to those of FIGS. 1 to 5 have been given the same reference signs. According to this variant of embodiment, in order to put the portion of the compression chamber of the shock-absorber comprised between the piston of the shock-absorber and the plunger of the hydraulic stop member into communication with the annular passage between the lower wall portion of the cup-shaped body and the inner cylindrical tube of the shock-absorber, and hence with the valve assembly placed on the bottom of the inner cylindrical tube, axial passages 42' are used in place of radial openings in the intermediate wall portion 36c of the cup-shaped body 32, which axial passages are formed on the outer surface of the inlet wall portion 36a and of the intermediate wall portion 36c and extend axially along the whole inlet wall portion 36a and the whole intermediate wall portion 36c (or at least along the largest part of the latter). Apart from that, what has been said above with reference to FIGS. 1 to 5 also applies to this variant of embodiment.

As clearly results from the above description, a hydraulic stop member according to the present invention allows to produce a damping force on the plunger of the stop member, and hence on the rod of the shock-absorber, which continuously and progressively varies with the compression stroke of the shock-absorber. Moreover, the law of variation of the damping force as a function of the travel may be defined in advance by suitably designing the cross-section of the axial channels on the inner surface of the cup-shaped body. Furthermore, the hydraulic stop member can be manufactured in a simple and inexpensive manner, thanks to the structure of the plunger and of the cup-shaped body.

Naturally, the principle of the invention remaining unchanged, the embodiments and the constructional details may vary widely from those described and illustrated purely by way of non-limiting example, without thereby departing from the scope of the invention as defined in the appended claims.

For example, the bottom wall 38 of the cup-shaped body 32 may have no passages 48 for the oil to flow out of the working chamber 46, in which case the function of limiting the maximum pressure of the oil in the working chamber may be performed by suitably calibrating the thickness of the gap 54a of the seal ring 54 of the plunger 34.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A hydraulic shock-absorber for a vehicle suspension, comprising a first cylindrical tube, a rod which is arranged coaxially with, and projects partially from, the first cylindrical tube, and a piston attached to an end portion of the rod, the piston being slidably mounted in the first cylindrical tube and separating an inner volume of the first cylindrical tube into a rebound chamber and a compression chamber in which a damping fluid is contained, the shock-absorber further comprising a first valve assembly on the piston, a second valve assembly on a bottom end of the compression chamber, and a hydraulic stop member which is mounted in the compression chamber and is adapted to operate during the compression stroke of the shock-absorber to hydraulically dissipate kinetic energy when the piston of the shock-absorber moves towards a compression end-of-travel position, wherein the hydraulic stop member comprises a cup-shaped body, which is mounted in a bottom area of the compression chamber of the shock-absorber, coaxially with the compression chamber, and a plunger, which is mounted on the rod of the shock-absorber, coaxially with the rod, on the same side as the piston of the shock-absorber, so as to slide in the cup-shaped body when the piston of the shock-absorber is close to the compression end-of-travel position, wherein the cup-shaped body comprises a side wall and a bottom wall which define, along with the plunger of the stop member, a working chamber in which the damping fluid is compressed by the plunger of the stop member when the latter slides in the working chamber towards the bottom wall of the cup-shaped body during the compression stroke of the shock-absorber, wherein axial channels are formed on the inner surface of the side wall of the cup-shaped body, which axial channels extend parallel to a longitudinal axis (z) of the cup-shaped body and allow the damping fluid to flow axially out of the working chamber when the plunger of the stop member slides in the working chamber towards the bottom wall of the cup-shaped body, said axial channels having a cross-section whose area decreases continuously along the longitudinal axis (z) towards the bottom wall of the cup-shaped body, wherein the side wall of the cup-shaped body comprises a first wall portion of cylindrical shape, which faces towards the opposite side of the bottom wall of the cup-shaped body and is securely connected to the first cylindrical tube inside the compression chamber, a second wall portion of cylindrical shape, which faces towards the bottom wall of the cup-shaped body and has an outer diameter smaller than the inner diameter of the first cylindrical tube, and a third, tapered wall portion, which connects the first wall portion with the second wall portion, said axial channels being formed on the inner surface of the second wall portion, wherein the first wall portion has an outer diameter substantially equal to the inner diameter of the first cylindrical tube, wherein an annular passage is defined between the second wall portion and the first cylindrical tube and is in fluid communication with the portion of the compression chamber underneath the bottom wall of the cup-shaped body, and wherein the side wall of the cup-shaped body has first passages that put the portion of the compression chamber comprised between the piston of the shock-absorber and the plunger of the stop member into communication with the second valve assembly in the bottom area of the compression chamber of the shock-absorber, wherein said first passages define radial openings formed on the third wall portion of the side wall of the cup-shaped body.

2. The hydraulic shock-absorber as set forth in claim 1, wherein said axial channels have a width, i.e. a circumferential size, and/or a depth, i.e. a radial size, which continuously decrease along the longitudinal axis (z) towards the bottom wall of the cup-shaped body.

3. The hydraulic shock-absorber as set forth in claim 1, wherein the side wall and the bottom wall of the cup-shaped body are made as separate pieces.

4. The hydraulic shock-absorber as set forth in claim 1, wherein the plunger comprises a cylindrical body, which is attached to the rod of the shock-absorber and has an outer diameter smaller than the inner diameter of the second wall portion of the cup-shaped body, a seal ring, which is mounted so as to be axially slidable around the cylindrical body and is adapted to seal against the inner surface of the second wall portion of the cup-shaped body, and first and second annular abutment members, which are axially restrained onto the cylindrical body and limit axially, in either direction, the axial sliding movement of the seal ring along the cylindrical body, the seal ring, the first abutment member and the second abutment member being configured such that when the seal ring slides along the inner surface of the second wall portion of the cup-shaped body during the compression stroke of the shock-absorber the seal ring is in abutment against the first abutment member and there is no flow of damping fluid from one side of the seal ring to the other, whereas during the rebound stroke of the shock-absorber the seal ring is in abutment against the second abutment member and the damping fluid is allowed to flow from one side of the seal ring to the other.

5. The hydraulic shock-absorber as set forth in claim 4, wherein the first and second abutment members are axially restrained onto the cylindrical body of the plunger by a pair of snap rings which are received in respective circumferential grooves of the cylindrical body.

6. The hydraulic shock-absorber as set forth in claim 1, wherein second passages are formed in the bottom wall of the cup-shaped body to allow the damping fluid to flow out of the working chamber of the cup-shaped body to limit the maximum pressure in said chamber.

7. The hydraulic shock-absorber as set forth in claim 1, further comprising a second cylindrical tube in which the first cylindrical tube is arranged coaxially therewith so as to define with the second cylindrical tube an annular chamber filled with gas in an upper portion thereof.

8. The hydraulic shock-absorber as set forth in claim 4, wherein a gauged ring gap is formed in the seal ring of the plunger to allow the damping fluid to flow out of the working chamber of the cup-shaped body to limit the maximum pressure in said chamber.

9. A hydraulic shock-absorber for a vehicle suspension, comprising a first cylindrical tube, a rod which is arranged coaxially with, and projects partially from, the first cylindrical tube, and a piston attached to an end portion of the rod, the piston being slidably mounted in the first cylindrical tube and separating an inner volume of the first cylindrical tube into a rebound chamber and a compression chamber in which a damping fluid is contained, the shock-absorber further comprising a first valve assembly on the piston, a second valve assembly on a bottom end of the compression chamber, and a hydraulic stop member which is mounted in the compression chamber and is adapted to operate during the compression stroke of the shock-absorber to hydraulically dissipate kinetic energy when the piston of the shock-absorber moves towards a compression end-of-travel position, wherein the hydraulic stop member comprises a cup-shaped body, which is mounted in a bottom area of the compression chamber of the shock-absorber, coaxially with the compression chamber, and a plunger, which is mounted on the rod of the shock-absorber, coaxially with the rod, on the same side as the piston of the shock-absorber, so as to slide in the cup-shaped body when the piston of the shock-absorber is close to the compression end-of-travel position, wherein the cup-shaped body comprises a side wall and a bottom wall which define, along with the plunger of the stop member, a working chamber in which the damping fluid is compressed by the plunger of the stop member when the latter slides in the working chamber towards the bottom wall of the cup-shaped body during the compression stroke of the shock-absorber, wherein axial channels are formed on the inner surface of the side wall of the cup-shaped body, which axial channels extend parallel to a longitudinal axis (z) of the cup-shaped body and allow the damping fluid to flow axially out of the working chamber when the plunger of the stop member slides in the working chamber towards the bottom wall of the cup-shaped body, said axial channels having a cross-section whose area decreases continuously along the longitudinal axis (z) towards the bottom wall of the cup-shaped body, wherein the side wall of the cup-shaped body comprises a first wall portion of cylindrical shape, which faces towards the opposite side of the bottom wall of the cup-shaped body and is securely connected to the first cylindrical tube inside the compression chamber, a second wall portion of cylindrical shape, which faces towards the bottom wall of the cup-shaped body and has an outer diameter smaller than the inner diameter of the first cylindrical tube, and a third, tapered wall portion, which connects the first wall portion with the second wall portion, said axial channels being formed on the inner surface of the second wall portion, wherein the first wall portion has an outer diameter substantially equal to the inner diameter of the first cylindrical tube, wherein an annular passage is defined between the second wall portion and the first cylindrical tube and is in fluid communication with the portion of the compression chamber underneath the bottom wall of the cup-shaped body, and wherein the side wall of the cup-shaped body has first passages that put the portion of the compression chamber comprised between the piston of the shock-absorber and the plunger of the stop member into communication with the second valve assembly in the bottom area of the compression chamber of the shock-absorber, wherein said first passages define axial passages which are formed on the outer surface of the first wall portion and of the third wall portion of the side wall of the cup-shaped body and extend axially along the whole first wall portion and along at least part of the third wall portion.

10. The hydraulic shock-absorber as set forth in claim 9, wherein said axial channels have a width, i.e. a circumferential size, and/or a depth, i.e. a radial size, which continuously decrease along the longitudinal axis (z) towards the bottom wall of the cup-shaped body.

11. The hydraulic shock-absorber as set forth in claim 9, wherein the side wall and the bottom wall of the cup-shaped body are made as separate pieces.

12. The hydraulic shock-absorber as set forth in claim 9, wherein the plunger comprises a cylindrical body, which is attached to the rod of the shock-absorber and has an outer diameter smaller than the inner diameter of the second wall portion of the cup-shaped body, a seal ring, which is mounted so as to be axially slidable around the cylindrical body and is adapted to seal against the inner surface of the second wall portion of the cup-shaped body, and first and second annular abutment members, which are axially restrained onto the cylindrical body and limit axially, in either direction, the axial sliding movement of the seal ring along the cylindrical body, the seal ring, the first abutment member and the second abutment member being configured such that when the seal ring slides along the inner surface of the second wall portion of the cup-shaped body during the compression stroke of the shock-absorber the seal ring is in abutment against the first abutment member and there is no flow of damping fluid from one side of the seal ring to the other, whereas during the rebound stroke of the shock-absorber the seal ring is in abutment against the second abutment member and the damping fluid is allowed to flow from one side of the seal ring to the other.

13. The hydraulic shock-absorber as set forth in claim 9, wherein second passages are formed in the bottom wall of the cup-shaped body to allow the damping fluid to flow out of the working chamber of the cup-shaped body to limit the maximum pressure in said chamber.

14. The hydraulic shock-absorber as set forth in claim 9, further comprising a second cylindrical tube in which the first cylindrical tube is arranged coaxially therewith so as to define with the second cylindrical tube an annular chamber filled with gas in an upper portion thereof.

* * * * *